2,923,661

N-[2-(1-PHENYL-PROPYL)]-2,2,2-TRICHLORO-ETHYLIDENIMINE

Chester J. Cavallito, Decatur, Ill., assignor to Irwin, Neisler and Co., Decatur, Ill., a corporation of Illinois No Drawing. Application March 22, 1957
Serial No. 647,737

5 Claims. (Cl. 167—55)

This invention relates to new organic compounds and is more particularly concerned with novel condensation products of chloral (or chloral hydrate) and amphetamine having utility in the field of pharmaceutical preparations.

Amphetamine has been widely prescribed by physicians for its central stimulating and appetite depressant effects. However, it is undesirable that the amount of amphetamine in the blood stream be high enough to produce over-stimulation. At the same time, a relatively prolonged effective time of action is also desired. Generally, the sulfate or phosphate salts of amphetamine have been employed, but these salts give an initial peak stimulating effect followed by a rapid decline in blood level and resulting adverse responses, subsequently followed by rapid disappearance of any effect. To provide a slower absorption rate and more prolonged blood level, it has been proposed that various coatings be used which tend to increase the time before the particular tablet ingredients are available for assimilation. However, in practice, the special coatings merely prolong the difference between the time of administration and the time that the active ingredients begin the desired action. Where a method is used which employs a gel or other binding material, the result usually is that the active ingredient is dependent upon the dissemination of gel prior to its being available for its original therapeutic purpose.

To overcome the above problem and present a pharmaceutical preparation which has a closely controllable absorption period without "peak" stimulation, I have now provided the new organic compound +=N-[2-(1-phenylpropyl)]-2,2,2-trichlorethylidenimine, and the dl-forms thereof.

These novel compounds are the chloral or chloral hydrate condensation products with amphetamine, which upon release within the intestine, undergo chemical alteration to regenerate amphetamine. (As used herein, wherever the term "chloral" is used, "chloral hydrate" may also be used.) The condensation products in the presence of water (in which they are fairly insoluble) slowly undergo hydrolysis to regenerate amphetamine and chloral. Thus, compounds are provided, which "meter out" the therapeutic agent in a slow uniform manner and over a long period of time with a minimum of peak or overstimulation effects.

Amphetamine                     Chloral hydrate

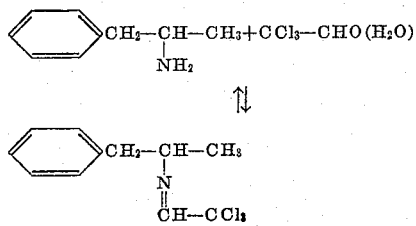

N-[2-(1-phenylpropyl)]-2,2,2-trichlorethylidenimine

Amphetamine contains an asymmetric carbon atom and is available as the d-isomer, the l-isomer, or the dl-racemate. The d-isomer is the pharmacologically desirable form. The dl-form can also be used since the body can selectively use the d form and therefore use of approximately double doses of the dl-form provide the desired dose of the active d-amphetamine.

The condensation product is conveniently administered in an edible oil, e.g. sesame oil, corn oil, peanut oil, other vegetable oils, synthetic waxy preparations of a non-toxic character such as are used under the trademark "Carbowax," etc., in which it is very soluble. While the amount of edible oil to be used is a matter of choice, the preferred range of quantity of oil used is between 0.1 and 1.0 cubic centimeter for the dosage forms discussed below. The equilibrium of the reversible reaction may be influenced, by also dissolving free chloral or chloral hydrate in the edible oil solution of the condensation product, so as to further reduce the rate of release of the amphetamine.

Chloral and amphetamine provide physiological responses which are almost opposite, but the relative doses of each which are needed to produce such responses differ so greatly in magnitude that the chloral which is regenerated upon hydrolysis of the condensation product is too small to have any measurable influence. Thus, the human dose of amphetamine is of the order of 3–10 milligrams, while the human dose of chloral is of the order of 300 milligrams or more. In practice the order of 15 milligrams of the novel condensation products has proved to be a convenient dosage amount.

It has been found possible to administer a solution of the condensation product in an edible oil in which has also been dissolved sufficient free chloral or chloral hydrate to provide a sedative effect. This results in an "alarm-clock" formulation which is taken orally to induce sleep through the rapid action of the chloral followed by a slow release of amphetamine from the condensation product such that upon awakening no post-sedative depression is present but rather a feeling of alertness. An example of such a formulation is one containing 300 milligrams of chloral hydrate and 15 milligrams of (+)N-[2-(1-phenylpropyl)]-2,2,2-trichloroethylidenimine made up with corn oil to a volume of 0.6 milliliter.

The amount of free chloral or chloral hydrate that could be included with the condensation product ranges up to about 50 parts of chloral or chloral hydrate to each part of the condensation product. With the lower proportions of free chloral or chloral hydrate various quantities of other sedatives or hypnotics, such as barbiturates, etc. might be added to provide the desired degree of sedation or hypnosis.

The novel products are made by the condensation reaction involving molar equivalents of d- or dl-amphetamine base with chloral or chloral hydrate. The reaction is preferably conducted in the presence of an organic solvent (which solvent is relatively inert chemically, water insoluble, and boils below about 150 degrees centigrade) e.g., benzene, toluene, xylene, chloroform, etc. The reaction mixture is heated to distill off azeotropically the solvent and water, two molar equivalents of water being separated where the chloral hydrate is used initially, and one molar equivalent where chloral is used. Then the remainder of the solvent is distilled off, and the residue is fractionally distilled to yield the desired product in the form of a liquid. The reaction could also be carried out in the absence of any solvent by warming the reagents.

The following example will more specifically illustrate a process for preparing the preferred embodiment of the present invention, but is not to be construed as limiting:

*Example.—(+)-N-[2-(1-phenylpropyl)]-2,2,2-trichloroethylidenimine*

Molar equivalents of d-amphetamine base and chloral hydrate were dissolved in benzene and the solution was heated to distill off benzene and water, azeotropically. Two molar equivalents of water were separated in this manner. The remainder of the benzene was distilled off, leaving a liquid residue which was then fractionally distilled to yield the clear, colorless liquid condensation product, +N-[2-(1-phenylpropyl)]-2,2,2-trichloroethylidenimine, which boiled at 95 degrees centigrade at a pressure of 0.5 millimeter of mercury, had an index of refraction, $n_D^{25}$ of 1.530 and a specific optical rotation of $+49.9 \pm 0.3$ degrees [c., 5 in dioxane].

*Analysis.*—Calculated for $C_{11}H_{12}Cl_3N$: C, 49.93; H, 4.75. Found: C, 50.17; H, 4.59.

Following the procedure of the above example, but using dl-amphetamine, the dl-form of N-[2-(1-phenylpropyl)]-2,2,2-trichloroethylidenimine was also prepared. It had the same boiling point and index of refraction as the (+) form above but its specific optical rotation was zero. The (−) form was also prepared by the above procedure but using l-amphetamine base, and had the same boiling point and index of refraction as the (+) and dl-forms. Its specific optical rotation was $-49.9 \pm 0.3$ degrees [c., 5 in dioxane].

It is to be understood that the invention is not to be limited to the exact details of operation or exact composition shown and described, as obvious modifications and equivalents will be apparent to one skilled in the art, and the invention is therefore to be limited only by the scope of the appended claims.

I claim:

1. A compound selected from the group consisting of dextro-rotatory and optically inactive -N-[2-(1-phenylpropyl)]-2,2,2-trichloroethylidenimine.

2. (+) - N - [2-(1-phenylpropyl)]-2,2,2-trichloroethylidenimine.

3. (±) - N - [2-(1-phenylpropyl)]-2,2,2-trichloroethylidenimine.

4. A solution of a member of the group consisting of (+) - N-[2-(1-phenylpropyl)]-2,2,2-trichloroethylidenimine, (±) - N - [2-(1-phenylpropyl)]-2,2,2-trichloroethylidenimine and mixtures thereof; in edible oil.

5. A solution of a member of the group consisting of (+) - N-[2-(1-phenylpropyl)]-2,2,2-trichloroethylidenimine, (±) - N - [2-(1-phenylpropyl)]-2,2,2-trichloroethylidenimine and mixtures thereof, in an edible oil, in which there is also dissolved a compound selected from the group consisting of chloral and chloral hydrate.

References Cited in the file of this patent

UNITED STATES PATENTS 2,468,592     Dorman     Apr. 26, 1949

OTHER REFERENCES

Wilson: Am. Drug Index, 1956, p. 118, Lippincott Co., Phila., Pa.

UNITED STATES PATENT OFFICE

CERTIFICATE OF CORRECTION

Patent No. 2,923,661            February 2, 1960

Chester J. Cavallito

It is hereby certified that error appears in the printed specification of the above numbered patent requiring correction and that the said Letters Patent should read as corrected below.

Column 1, line 44, for "+=N-" read -- +N- --; line 58, after "overstimulation effects." insert as the beginning of a new paragraph the following:

-- The following reversible reaction is illustrative: --; column 3, line 14, for "4.75" read -- 4.57 --.

Signed and sealed this 30th day of August 1960.

(SEAL)
Attest:

ERNEST W. SWIDER
Attesting Officer

ROBERT C. WATSON
Commissioner of Patents